United States Patent
Venkatesh et al.

(10) Patent No.: US 9,965,431 B2
(45) Date of Patent: May 8, 2018

(54) SYSTEM AND METHOD TO IMPROVE USB MASS STORAGE DEVICE ARRIVAL ACCELERATION FOR REDIRECTED USB MASS STORAGE DEVICES

(71) Applicant: Dell Products L.P., Round Rock, TX (US)

(72) Inventors: Ramanujam K. Venkatesh, Bangalore (IN); Gokul T. Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 440 days.

(21) Appl. No.: 14/836,310

(22) Filed: Aug. 26, 2015

(65) Prior Publication Data

US 2017/0060802 A1    Mar. 2, 2017

(51) Int. Cl.
*G06F 13/20* (2006.01)
*G06F 13/40* (2006.01)
*G06F 13/42* (2006.01)

(52) U.S. Cl.
CPC ...... *G06F 13/4072* (2013.01); *G06F 13/4022* (2013.01); *G06F 13/4282* (2013.01)

(58) Field of Classification Search
None
See application file for complete search history.

(56) References Cited

U.S. PATENT DOCUMENTS

2011/0246984 A1\* 10/2011 Sharp ............... G06F 3/0605
718/1

OTHER PUBLICATIONS

FSCTL_LOCK_VOLUME control code by Microsoft at <https://msdn.microsoft.com/en-us/library/windows/desktop/aa364575(v=vs.85).aspx>, 2015, 3 pages, printed Jul. 28, 2015.
Universal Serial Buss Mass Storage Class, Bulk-Only Transport, Revision 1.0, Sep. 31, 1999, USB Implementers Forum, 22 pages, <http://www.usb.org/developers/docs/devclass_docs/usbmassbulk_10.pdf>.
FSCTL_DISMOUNT_VOLUME control code by Microsoft at <https://msdn.microsoft.com/en-us/library/windows/desktop/aa364562(v=vs.85).aspx>, 2015, 3 pages, printed Jul. 28, 2015.
U.S. Patent Application entitled System and Method to Redirect USB Mass Storage Devices in High Latency VDI Environments by Gokul T. Vajravel et al. filed Jul. 29, 2015.

\* cited by examiner

*Primary Examiner* — Idriss N Alrobaye
*Assistant Examiner* — Richard B Franklin
(74) *Attorney, Agent, or Firm* — Baker Botts L.L.P.

(57) ABSTRACT

In certain information handling system environments, physical devices connected to a client are redirected to a server or other information handling system. The time to redirect a universal serial bus (USB) mass storage device may be lengthy given that the same metadata must be read several times. Arrival time of a redirected USB mass storage device may be decreased by collecting the complete metadata at the client and transmitting that complete metadata to the server. The server builds a metadata cache to store the metadata received from the client. Efficiencies are achieved by caching the complete metadata associated with the redirected device at the server instead of making repeated transactions requesting the same metadata from the client.

20 Claims, 5 Drawing Sheets

SYSTEM AND METHOD TO IMPROVE USB MASS STORAGE DEVICE ARRIVAL ACCELERATION FOR REDIRECTED USB MASS STORAGE DEVICES

TECHNICAL FIELD

This disclosure generally relates to improving universal serial bus (USB) mass storage device arrival time for redirected USB mass storage devices over a network, for example, a wide-area network (WAN).

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

Prior universal serial bus (USB) technology utilized in VDI environments emulated virtual USB hardware on a virtual USB bus driver on an information handling system, such as a server. The operating system of the server loaded a real driver and applications for the virtual USB hardware in the same way as such would be loaded for real physical hardware. When the application tried to access or use a virtual device or virtual hardware, the requests from the application would be translated as transaction requests (for example, URB) directed to the virtual USB hardware on the server. The virtual USB bus driver redirected the USB request block (URB) transactions to another information handling system, such as a client, where the real physical hardware was actually located. The received transaction requests from the server were then submitted to the real USB hardware via a stub driver on the client. The resulting responses from the real USB hardware would then be transported back to the server and pumped to the virtual USB bus driver. The virtual USB bus driver then passed these responses back to the respective applications via the real driver, thus completing the loop. These URBs may contain read/write requests to a USB mass storage device.

The arrival time for a redirected USB mass storage device may be very large or excessive over a wide-area network (WAN). The transactions, such as URBs, to and the responses from the physical USB mass storage device (collectively, "input/output (I/O) transactions") may be numerous and large. These I/O transactions exchanged between the server and the client may require several minutes depending on the latency of the network. One reason for such delay is the that the server may be that the server (location of the virtual USB mass storage device) attempts to read the same metadata associated with the I/O transactions many times. The reading of this metadata may take multiple I/O transactions as no single I/O transaction may request complete metadata. The present disclosure provides systems and methods to address this problem.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
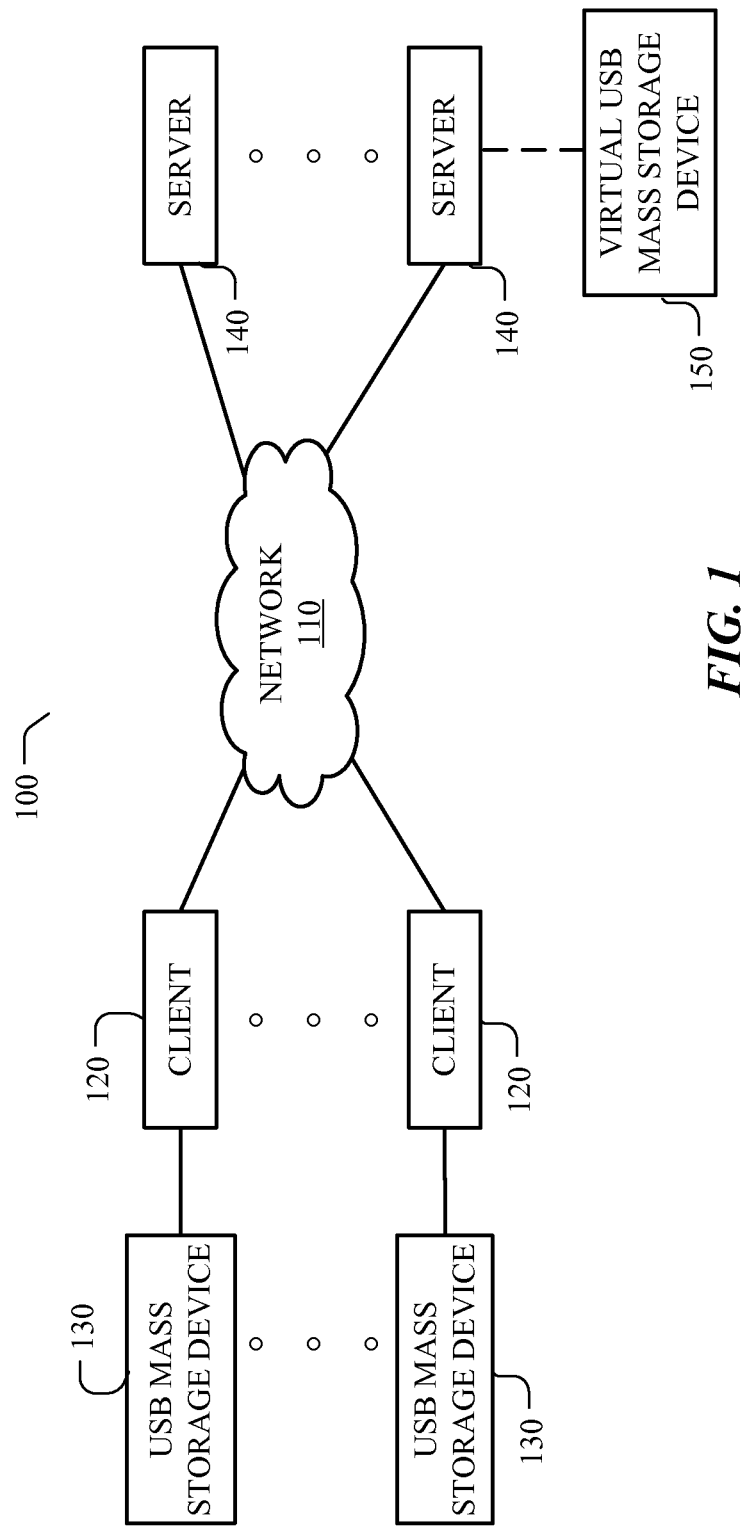
FIG. 1 illustrates an example configuration of networked information handling systems according to one embodiment of the present disclosure.

This disclosure generally relates to remote computing and, in particular, relates to utilizing read-ahead metadata to increase the efficiency of input/output (I/O) transactions related to a redirected universal serial bus (USB) mass storage device. For example, when a USB mass storage device is redirected, the arrival time may require a very long time period over certain networks, such as wide-area networks (WAN), due to the exchange of universal request blocks (URB) and responses between the client and server. In one example, a Kingston USB mass storage device exchanges 2000 I/O transactions between a client and a server when the USB mass storage device is redirected at the server. If the network has a latency of 150 milliseconds, then 2000 I/O transactions multiplied by the 150 millisecond latency means that it may take up to five minutes or more for the complete USB mass storage device information required to create the virtual USB mass storage device at the server is delivered so that the server can build the necessary file system associated with the virtual USB mass storage device. This may be due to several reasons including, for example, the operating system (OS) of the server attempting to read the same metadata associated with the USB mass storage device to be virtualized many times. Such metadata may include, for example, information related to the master boot record (MBR), boot sector, and partition table for each partition. The metadata for a file allocation table (FAT) file system may include FAT area and root directory. The metadata for a new technology file system (NTFS) may include a master file table.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive or floppy disk), a sequential access storage device (for example, a tape disk drive), compact disk, compact disk read-only memory (CD-ROM), digital video disc (DVD), random access memory (RAM), ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a WAN or a LAN. In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple user may login to the same server. The users may be permitted to work simultaneously even though they may be physically located at separate locations. According to the present disclosure, the users may be permitted to simultaneously access data, applications, and/or hardware associated with the server (or other information handling system). The server itself may be a physical machine or a virtual machine (VM).

A user may access devices redirected to the server as if those devices are available locally to the user by connecting all the necessary peripherals. For example, the user may connect to USB printers, USB scanners, USB mass storage devices, and any other device known to one of ordinary skill in the art.

According to the present disclosure, individual interfaces associated with a single physical device may be installed locally or may be redirected to another information handling device, such as a server. Interfaces forwarded to the server may be mounted as virtual devices at the server and may be shared with additional information handling systems. In some embodiments, one interface associated with a composite device may be redirected to one server, a second interface may be redirected to a second server, and a third interface may be installed locally.

As an example, if a USB mass storage device is connected to a given client via a standard USB connection, the locally connected USB mass storage device may be redirected to the server. The redirected USB mass storage device may then be installed locally for use by any number of clients. The server treats the USB mass storage device as a virtual mass storage device attached to the server.

FIG. 1 at 100 illustrates an example configuration of a networked information handling system. In particular embodiments, one or more client devices 120 and one or more servers 140 are connected via network 110. Network 110 may be a WAN, local-area network (LAN) or any other type of network known to one of ordinary skill in the art. Many types of peripheral devices may be connected locally to the client devices 120. As shown in FIG. 1, in some embodiments, one or more USB devices 130 connect to the client devices 120. According to the present disclosure, one or more USB mass storage devices 130 may appear to one or more of servers 140 as if they are locally installed on and connected to those servers 140. In certain embodiments, these USB mass storage devices 130 may be redirected such that they appear to be locally installed or locally shared with another client device 120. In one embodiment, the Dell Wyse TCX USB Virtualization is used to virtualize the USB mass storage device 130. In one or more embodiments, one or more USB mass storage devices 130 may be virtualized as virtual USB mass storage device 150 at a server 140.

Figure 2:
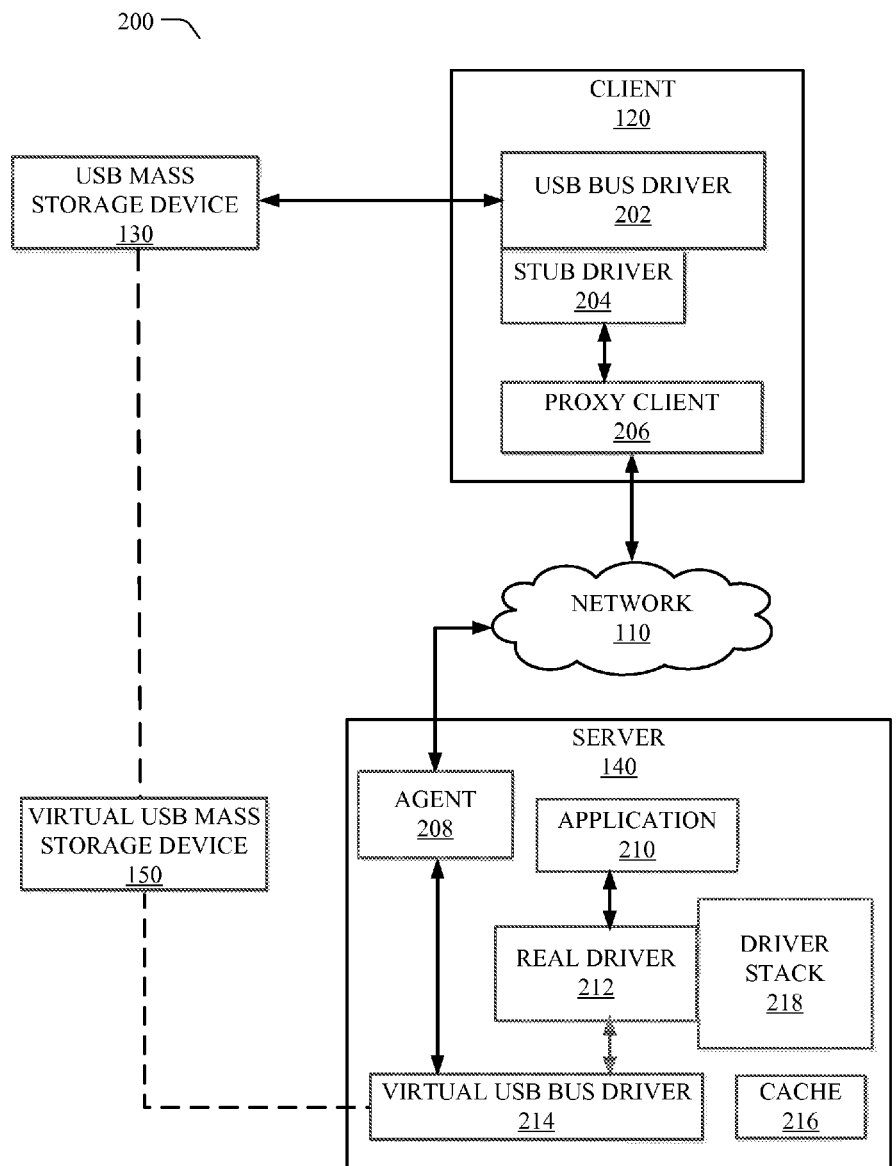
FIG. 2 illustrates an example system of a networked client and server according to one embodiment of the present disclosure.

FIG. 2 at 200 illustrates an example embodiment of a system configured to redirect a USB mass storage device 130, for example, a USB hard disk drive (HDD). In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

In particular embodiments, client 120 connects to server 140 via network 110. In one embodiment, network 110 may be a WAN network. In other embodiments, network 110 may be a LAN network or any other type of network known to one of ordinary skill in the art. Network 110 may also be a high latency network.

When a USB mass storage device 130 is initially connected to client 120, client 120 may attempt to initialize USB mass storage device 130 by attempting to load a USB bus driver 202. According to the present disclosure, client 120 may determine (or may permit a user to determine) whether to redirect USB mass storage device 130 upon connection of the USB mass storage device 130, as part of the initialization of USB mass storage device 130. In particular embodiments, client 120 may make a new determination regarding the installation of USB mass storage device 130 after USB mass storage device 130 has been initialized. For example, a user may decide that the USB mass storage device 130 that was previously installed on its local client 120 should be redirected to server 140. Client 120 may be configured to automatically install all or only certain USB mass storage devices 130 locally, may be configured to automatically redirect all or certain USB mass storage devices 130 to server 140, or may be configured to request input from a user of client 120 or from another source to determine whether to install a particular USB mass storage device 130 locally or to redirect it.

If a USB mass storage device 130 is configured to be redirected to server 140, the redirection may operate generally as described in U.S. Pat. No. 8,010,630 to Barreto, et al., which is incorporated herein by reference. A proxy client 206 on client 120 may coordinate communications between USB mass storage device 130 and an agent 208 running on server 140. In particular proxy client 208 may be configured to receive socket connection information from server 140 and initiate redirecting I/O transactions between USB mass storage device 130 and agent 208. Agent 208 may be configured to register with the OS of server 140 to receive notification of an establishment of any remote access connection. In one embodiment, proxy client 206 may be configured to receive socket connection information from agent 208 of server 140 and initiate redirecting I/O transactions to and from USB mass storage device 130 to agent 208 on server 140.

Virtual USB bus driver 214 receives information about USB mass storage device 130 that is to be redirected from agent 208. Virtual USB bus driver 214 may be a Wyse virtual USB bus driver wvusbbus.sys, for example. Virtual USB bus driver 214 calls real driver 212 associated with the virtual USB mass storage device 150, to complete the initialization of the virtual USB mass storage device 150 on server 140. Based on the USB mass storage device type enumerated by the virtual USB bus driver 214, the appropriate OS stack will be created. The I/O transactions will reach the bottom of the OS stack which is the virtual USB bus driver 214. The virtual USB bus driver 214 along with an auxiliary server, transfers these I/O transactions to the client 120 via the agent 208 on the server 140 and the proxy client 206 on the client 120.

The virtual USB mass storage device 150 associated with the USB mass storage device 130 then functions as if the USB mass storage device 130 was locally connected to server 140 (as indicated by the dashed line between USB mass storage device 130 and virtual USB mass storage device 150). The virtual USB mass storage device 150 may thus be made available to application 210 running on server 140, which treats the virtual USB mass storage device 150 as a local device.

Metadata associated with USB mass storage device 130 may be collected at the proxy client 206. The collection of metadata at the proxy client 206 may be referred to as a read-ahead mechanism. The collection of metadata is stored at the proxy client 206. Metadata associated with the USB mass storage device 130 that has been redirected as virtual USB mass storage device 150 may be cached in cache 216 at the server 140.

The application 210 may make requests to access one or more virtual USB mass storage devices 150. These requests are translated as transaction requests or URBs directed to the virtual USB mass storage device 150 at the server 140. The virtual USB bus driver 214 redirects the URBs to the client 120 where the associated USB mass storage device 130 is located. These requests from the server 140 are transmitted to the USB mass storage device 130 via a proxy client 206. The proxy client 206 transmits the requests to a stub driver 204 which transmits the requests to the USB mass storage device 130 via USB bus driver 202. The responses from the USB mass storage device 130 are transmitted back to the server 140 via agent 208 and pumped to the virtual USB bus driver 214. The virtual USB bus driver 214 passes the responses back to the respective applications 210 via the real driver 212. Application 210 may be one or more applications and may be one or more virtual applications.

Figure 3:
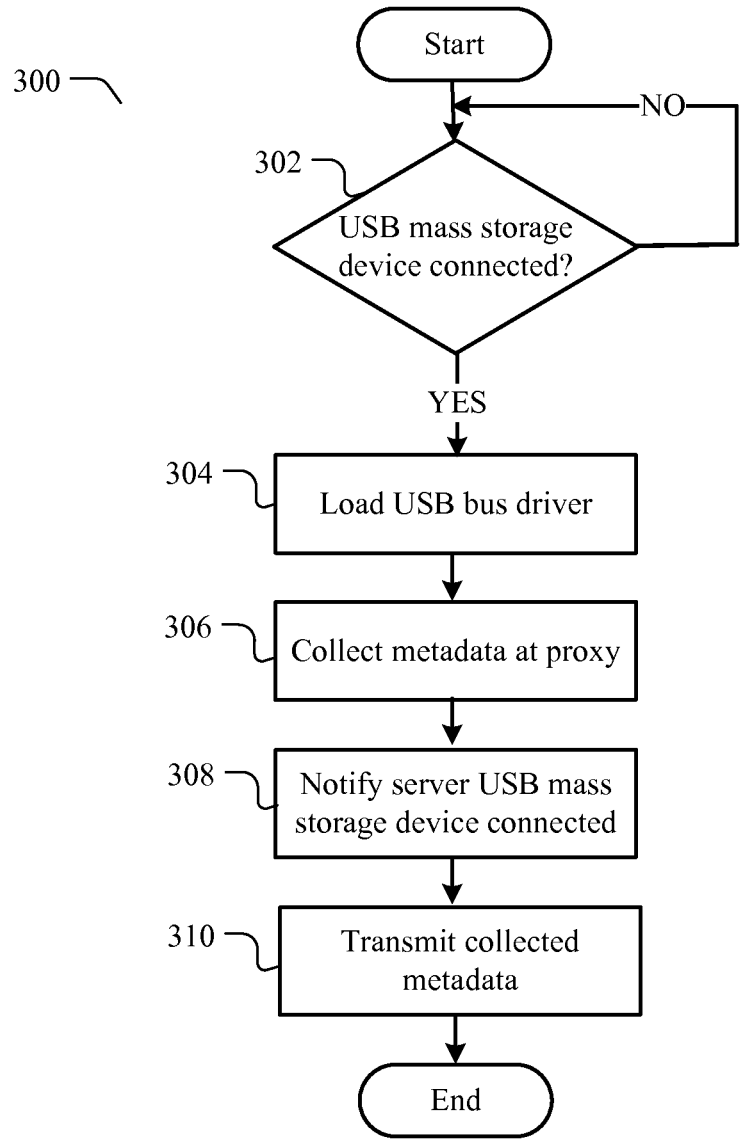
FIG. 3 illustrates an example of steps involved in one method according to one embodiment of the present disclosure.

FIG. 3 is a flow chart in accordance with an embodiment of the present disclosure, shown generally at 300, relating to collecting metadata associated with a USB mass storage device 130 at client 120 that is to be redirected to a server 140. At step 302, the client 120, via proxy client 206, polls to determine if a USB mass storage device 130 has been connected to client 120. Proxy client 206 may determine if a USB mass storage device 130 is connected by any process known to one of ordinary skill in the art. For example, in one embodiment a user may use a graphical user interface (GUI) to inform the client 120 that a USB mass storage device 130 has been connected. In another embodiment, the client 120 may automatically detect without user intervention the connection of a USB mass storage device 130. USB mass storage device 130 may be any known mass storage device including, but not limited to, a USB thumb drive, a USB HDD or any other USB storage device known to one of ordinary skill in the art that can be coupled to the client 120 via a USB. Client 120 may poll for a connection in any way known to one of ordinary skill in the art, including, but not limited, waiting on an interrupt, timer, semaphore, etc. that indicates connection of a USB mass storage device such as USB mass storage device 130.

If a USB mass storage device 130 is connected to the client 120, then at step 304, the OS of the client 120 loads a USB bus driver 202. At step 306, the proxy client 206 collects the metadata, if any, associated with the USB mass storage device 130. For example, in one embodiment, once the USB mass storage device 130 is connected to the client 120, the proxy client 206 checks to see if a file system associated with the USB mass storage device 130 is mounted and if so the proxy client 206 collects the metadata and stores the metadata internally.

At step 308, the client 120 notifies the server 150 that USB mass storage device 130 is connected to client 120. In one embodiment, the USB mass storage device 130 of client 120 sends a request via proxy client 206 to the server 140 via agent 208 to request that the server 140 create a virtual USB mass storage device 150 corresponding to the USB mass storage device 130. In another embodiment, the server 140 receives a device plug-in notification from the client 120 that USB mass storage device has been connected (for example, directly or communicatively) to client 120. The server 140 may then determine if one or more applications 210 need access to the USB mass storage device 130 and if so the server 140 creates a virtual USB mass storage device corresponding to the USB mass storage device 130. In another embodiment, the server 140 automatically virtualizes the USB mass storage device 130 any time the server 130 receives a notification from a client 120 that a USB mass storage device 130 has been connected. In other embodiments, the server may only automatically redirect the USB mass storage device 130 upon notification if the USB mass storage device 130 is determined to be of a predetermined type based on one or more of the one or more parameters received along with the device plug-in notification. For example, the type may be a USB thumb drive, USB HDD, or any other type of USB mass storage device known to one of ordinary skill in the art. The predetermined type may be stored as a setting in memory, set via a GUI, or any other way known to one of ordinary skill in the art. In another embodiment, the server 140 may only redirect the USB mass storage device 130 when requested by an application 210. Redirection of USB mass storage device 130 may further be redirected according to any other ways, processes or methods known to one of ordinary skill in the art.

At step 310, the collected metadata and one or more parameters associated with USB mass storage device 130 are transmitted from the client 120 via proxy client 206 to the server via agent 208. In one embodiment, the metadata and one or more parameters may be transmitted with the device plug-in notification sent at step 308. The one or more parameters may include sector size, disk size, device type, serial number, vendor identification, manufacturer identification, product identification or any other parameter known to one of ordinary skill in the art.

Figure 4:
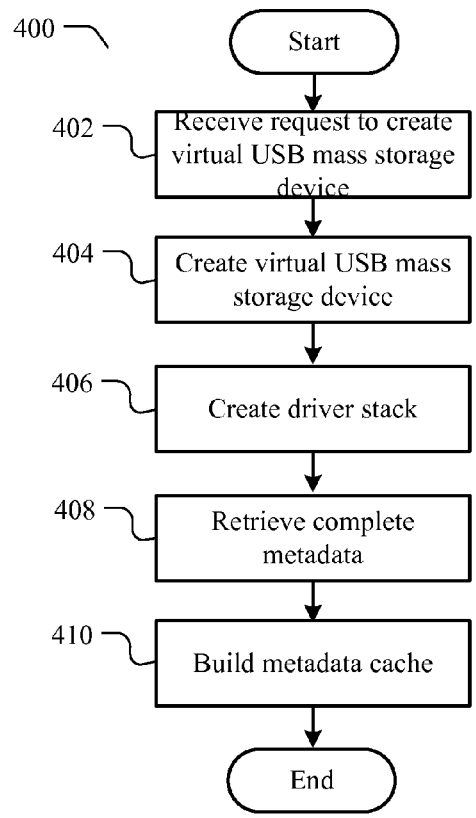
FIG. 4 illustrates an example of steps involved in one method according to one embodiment of the present disclosure.

FIG. 4 is a flow chart in accordance with one embodiment of the present invention shown generally at 400. At step 402, the server 140 receives a notification (for example, a device plug-in notification) from the client 120 that a USB mass storage device 130 is ready for virtualization such that it can be accessed from one or more applications 210. The notification is sent from the proxy client 206 to the agent 208. The metadata and one or more parameters associated with the USB mass storage device 130 are received with the device plug-in notification. At step 404, the agent 208 issues a command, for example, an I/O control (IOCTL) command or any other such command known to one of ordinary skill in the art for the virtual USB bus driver 214 to create the virtual USB mass storage device 150. The virtual USB mass storage device 150 is created based, at least in part, on the notification, for example, based on the metadata, the one or more parameters or any combination thereof. The virtual USB bus driver 214 calls the real driver 212 to complete the initialization of the virtual USB mass storage device 150 and based on the USB mass storage device type enumerated by the virtual USB bus driver 214, the appropriate driver stack 218 will be created to properly manage the functionality of the virtual USB mass storage device 150. At step 406 the driver stack 218 is created by the virtual USB bus driver 214.

At step 408, the server 140 retrieves from the agent 208 the complete metadata associated with the USB mass storage device 130 that has been redirected as virtual USB mass storage device 150. At step 410, agent 208 of the server 140 builds a metadata cache 216 associated with the virtual USB mass storage device 150 to store the received complete metadata cache 216.

Figure 5:
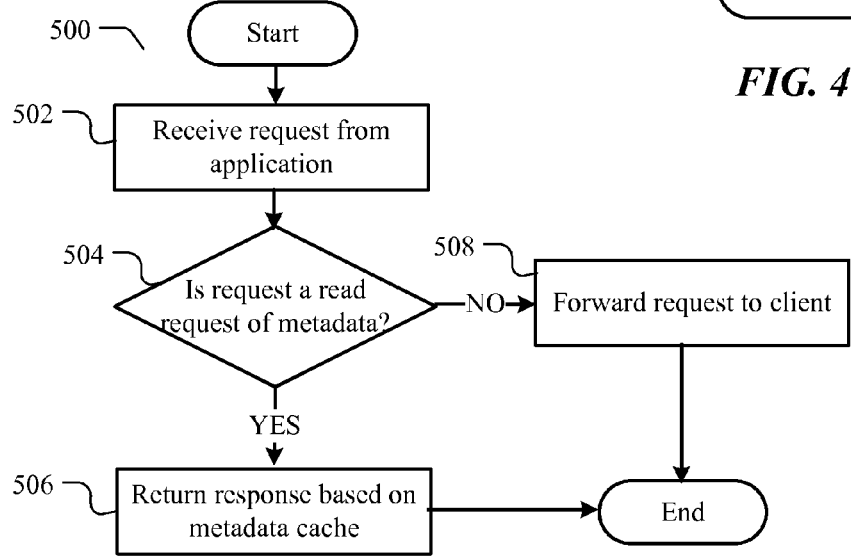
FIG. 5 illustrates an example of steps involved in one method according to one embodiment of the present disclosure.

FIG. 5 is a flowchart in accordance with one embodiment of the present invention shown generally at 500. At step 502, the agent 208 receives a request from an application 210 to access the virtual USB mass storage device 150. The request may be any type of I/O transaction, for example a URB. At step 504, it is determined by the agent 208 the type of request received, for example, if the request is a read request of metadata. If it is not a read request of metadata, then at step 508 the request is forwarded via agent 208 to the USB mass storage device 130 via proxy client 206. If it is a read request of the metadata then at step 506, the agent 208 retrieves from the cache 216 the metadata associated with the received request (the metadata associated with the virtual USB mass storage device 150). The agent 208 returns a response based, at least in part, on the retrieved metadata to the virtual USB bus driver 214 which transmits the response back to the requesting application 210.

Figure 6:
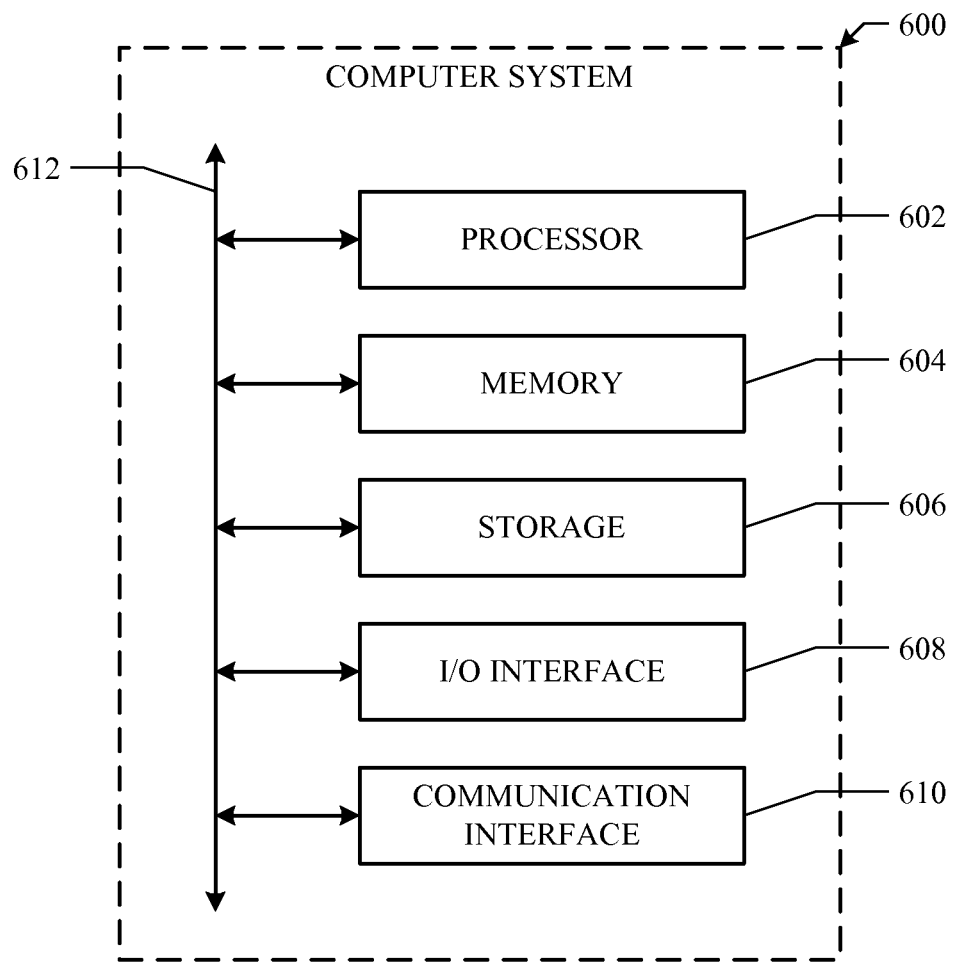
FIG. 6 illustrates an example computing system according to one embodiment of the present disclosure.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an I/O interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), HDDs, hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving, at an agent of a server, a notification that a universal serial bus (USB) mass storage device has been connected to a client, wherein the notification comprises collected metadata associated with the USB mass storage device;
   creating by a virtual USB bus driver a virtual USB mass storage device associated with the USB mass storage device;
   creating a driver stack based on a device type of the USB mass storage device enumerated by the virtual USB bus driver;
   building a metadata cache at the server with the collected metadata;
   receiving a request from an application to access the virtual USB mass storage device;
   determining if the request is a read request of metadata associated with the USB mass storage device; and
   sending to the application a response based on the cached collected metadata.

2. The method of claim 1, wherein the virtual USB mass storage device is created based, at least in part on the notification.

3. The method of claim 1, further comprising:
   calling by the USB bus driver a real driver to complete initialization of the virtual USB mass storage device.

4. The method of claim 1, wherein the USB mass storage device comprises one of a USB thumb drive or a USB hard disk drive.

5. The method of claim 1, wherein the one or more parameters comprises at least one of a device type, a serial number, vendor identification, and manufacturer identification.

6. The method of claim 1, wherein the request from the application is a USB request block.

7. The method of claim 1, wherein the response is sent to the application by a real driver, and wherein the real driver receives the response from the virtual USB bus driver.

8. A system comprising:
   a first server;
   one or more central processing units for processing information of the first server;
   a memory of the first server communicatively coupled to the one or more central processing units; and
   one or more modules that comprise instructions stored in the memory, the instructions, when executed by the one or more processing units, operable to perform operations comprising:
      receiving, at an agent of a server, a notification that a universal serial bus (USB) mass storage device has been connected to a client, wherein the notification comprises collected metadata associated with the USB mass storage device;
      creating by a virtual USB bus driver a virtual USB mass storage device associated with the USB mass storage device;
      creating driver stack based on a device type of the USB mass storage device enumerated by the virtual USB bus driver;
      building a metadata cache at the server with the collected metadata;
      receiving a request from an application to access the virtual USB mass storage device;
      determining if the request is a read request of metadata associated with the USB mass storage device; and
      sending to the application a response based on the cached collected metadata.

9. The system of claim 8, wherein the virtual USB mass storage device is created based, at least in part on the notification.

10. The system of claim 8, wherein the instructions further operable to perform operations comprising:
    calling by the USB bus driver a real driver to complete initialization of the virtual USB mass storage device.

11. The system of claim 8, wherein the USB mass storage device comprises one of a USB thumb drive or a USB hard disk drive.

12. The system of claim 8, wherein the one or more parameters comprises at least one of a device type, a serial number, vendor identification, and manufacturer identification.

13. The system of claim 12, wherein the response is sent to the application by a real driver, and wherein the real driver receives the response from the virtual USB bus driver.

14. The system of claim 8, wherein the request from the application is a USB request block.

15. One or more computer-readable non-transitory storage media embodying software operable when executed by one or more computer systems to:
    receive, at an agent of a server, a notification that a universal serial bus (USB) mass storage device has been connected to a client, wherein the notification comprises collected metadata associated with the USB mass storage device;
    create by a virtual USB bus driver a virtual USB mass storage device associated with the USB mass storage device;
    create a driver stack based on a device type of the USB mass storage device enumerated by the virtual USB bus driver;
    build a metadata cache at the server with the collected metadata;
    receive a request from an application to access the virtual USB mass storage device;

determine if the request is a read request of metadata associated with the USB mass storage device; and send to the application a response based on the cached collected metadata.

16. The media of claim 15, wherein the virtual USB mass storage device is created based, at least in part on the notification.

17. The media of claim 15, wherein the software is further operable when executed to:

call by the USB bus driver a real driver to complete initialization of the virtual USB mass storage device.

18. The media of claim 15, wherein the USB mass storage device comprises one of a USB thumb drive or a USB hard disk drive.

19. The media of claim 15, wherein the one or more parameters comprises at least one of a device type, a serial number, vendor identification, and manufacturer identification.

20. The media of claim 15, wherein the response is sent to the application by a real driver, and wherein the real driver receives the response from the virtual USB bus driver.

* * * * *